United States Patent [19]

Cordts et al.

[11] E Patent Number: Re. 32,834

[45] Reissued Date of Patent: Jan. 17, 1989

[54] AQUEOUS LIQUID FILLED POLYURETHANE GELS AND METHOD OF MAKING THE SAME

[75] Inventors: Howard P. Cordts, Grafton; Joan E. Karloske, Saukville, both of Wis.

[73] Assignee: Freeman Chemical Corporation, Port Washington, Wis.

[21] Appl. No.: 48,726

[22] Filed: May 11, 1987

Related U.S. Patent Documents

Reissue of:

[64] Patent No.: 4,517,326
Issued: May 14, 1985
Appl. No.: 487,507
Filed: Apr. 22, 1983

U.S. Applications:

[63] Continuation-in-part of Ser. No. 273,499, Jun. 15, 1981, abandoned.

[51] Int. Cl.[4] ..... C08L 75/08

[52] U.S. Cl. ..... 524/310; 106/15.05; 264/4; 264/299; 252/500; 424/78; 428/423.7; 523/113; 523/114; 523/122; 524/377; 524/386; 524/389; 524/539; 524/591; 524/908; 524/916

[58] Field of Search ..... 524/310, 377, 386, 389, 524/539, 591, 908, 916; 523/113, 114, 122; 3/36; 252/500; 264/4, 299

[56] References Cited

U.S. PATENT DOCUMENTS

| | | | |
|---|---|---|---|
| 3,429,827 | 2/1969 | Ruus | 252/316 |
| 3,577,515 | 5/1971 | Vandegaer | 252/316 |
| 3,822,238 | 7/1974 | Blair et al. | 525/440 |
| 3,872,050 | 3/1975 | Benton et al. | 260/37 N |
| 3,939,123 | 2/1976 | Matthews et al. | 528/61 |
| 3,975,350 | 8/1976 | Hudgin et al. | 524/108 |
| 4,182,827 | 1/1980 | Jones et al. | 528/60 |
| 4,193,889 | 3/1980 | Baatz et al. | 252/316 |
| 4,322,327 | 3/1982 | Yoshimura et al. | 524/916 |

FOREIGN PATENT DOCUMENTS

| | | |
|---|---|---|
| 14155 | 5/1974 | Japan . |
| 1478000 | 6/1977 | United Kingdom . |

*Primary Examiner*—Theodore E. Pertilla
*Attorney, Agent, or Firm*—John Cooper, III; Fred Wiviott; C. Thomas Sylke

[57] ABSTRACT

A liquid-filled polyurethane elastomer gel is fabricated from water, organic glycol and a polyisocyanate prepolymer. The prepolymer is formed from organic diisocyanate and organic diol or triol having a molecular weight of 3,000 to 10,000 and containing at least 40 percent by weight ethylene oxide adducts. The prepolymer is mixed with 3 to 20 times its weight of aqueous reactant including 25 to 65 percent by weight water and 75 to 35 percent by weight organic polyol. The resulting stable gel contains aqueous solutions of emulsions dispersed therein as small droplets comprising 75 to 95 percent of the weight of the resulting article. The liquid-filled polyurethane elastomer gel can be cast into shapes or can be formed into globs of random shape.

38 Claims, No Drawings

AQUEOUS LIQUID FILLED POLYURETHANE GELS AND METHOD OF MAKING THE SAME

Matter enclosed in heavy brackets [ ] appears in the original patent but forms no part of this reissue specification; matter printed in italics indicates the additions made by reissue.

CROSS REFERENCES TO RELATED APPLICATIONS

This application is a continuation-in-part of co-pending application Ser. No. 273,499, filed on June 15, 1981, now abandoned, and assigned to the assignee of the present application.

BACKGROUND OF THE INVENTION

1. Field of the Invention

This invention relates to polyurethane elastomer gels which are filled with dispersed discrete droplets of aqueous liquids and to a method of making such filled gels.

2. Description of the Prior Art

Polyurethane elastomers are fabricated from the reaction of polyisocyanates and polyols. The encapsulation of non-aqueous liquids in polyurethane films and elastomers is described in U.S. Pat. No. 3,872,050. In general, when attempts are made to encapsulate aqueous liquids in polyurethane, the water functions as a blowing agent and creates polyurethane foams which are undesirable in the encapsulated gel products.

Japan Pat. No. 49-14155 (1974) describes a water filled polyurethane gel which contains a large amount of water as a filler in homogeneous dispersion. The use of large quantities of water avoids the objectionable formation of foams when water is contacted with polyisocyanates prepolymers as described in that Japan patent. The difficulty with water filled polyurethane elastomer gels is several fold. First, such water filled polyurethane elastomer gels tend to shrink rapidly by loss of the water. The shrunken gel can be partially revived by soaking in water or aqueous fluids. However the dimensional recovery is less than 90 percent.

Secondly, the water filled polyurethane elastomer gels do not develop tackiness on the surface. Surface tackiness is a desirable characteristic for many end use applications of such liquid filled polyurethane elastomer gels. In addition the processing time for handling water filled polyurethane elastomer gels is limited, perhaps 60 seconds maximum.

Thus there is a need for a liquid filled elastomer gel which has substantially retarded shrinking tendencies, which can develop surface tackiness where desired, and which has an extended processing time to facilitate preparation of useful products.

STATEMENT OF THE INVENTION

According to the present invention, a polyisocyanate prepolymer of an organic di-isocyanate and a polyether diol or triol containing at least 40% by weight of ethylene oxide adducts is employed to produce an elastomer gel for encapsulating aqueous liquids. The product is a thermoset article having a polyurethane elastomer gel as a continuous phase and having an aqueous liquid discontinuous phase. The described polyisocyanate prepolymer is combined with aqueous reactant and rapidly mixed to accomplish cross-linking of the polyisocyanate prepolymers by reaction with water and to disperse the aqueous reactant homogeneously in the form of discrete droplets throughout the elastomer gel. The aqueous reactant includes 35 to 75 percent by weight of organic polyol, such as ethylene glycol, propylene glycol, diethylene glycol, dipropylene glycol, bis(2-hydroxy-ethoxyethyl) glutarate, or polypropylene oxide adducts of diols or triols.

The prepolymer employs any available di-isocyanates or mixtures of di-isocyanates with polyisocyanates having an NCO—value less than 2.2, such as toluene di-isocyanate, polymethylene-polyphenylene-di-isocyanate, isophorone di-isocyanate, aliphatic di-isocyanate along with the polyether containing at least 40% by weight ethylene oxide adduct. The resulting prepolymer has an NCO—value of 2.5–3.0. Typical polyols are diols and triols formed by combining ethylene oxide with lower molecular weight diols such as glycerine or a glycol. The polyol may also employ some propylene oxide or butylene oxide or other aliphatic oxides as adducts. The high concentration of ethylene oxide adduct in the polyol ingredient achieves the water retention characteristics which are unique in the present polyurethane gels. A preferred polyol contains at least 40 weight percent ethylene oxide adduct. A preferred polyether polyol has a molecular weight of 3,000 to 10,000.

The polyurethane gel is prepared by combining the polyisocyanate prepolymer with an aqueous reactant containing organic polyol and rapidly mixing the two ingredients until the aqueous reactant is homogeneously dispersed in the form of droplets. The mixture is allowed to complete its gelation to produce the liquid filled elastomer gel.

In an alternative embodiment, the process is carried out in two stages wherein water is mixed with the polyisocyanate prepolymer in a first stage and gelation is commenced. After the gelation is under way, the organic polyol alone or with supplemental water is added to the mixture in a second stage and mixed to disperse the liquids.

The organic polyol may be completely soluble in water, e.g., ethylene glycol, or may be partially soluble in water. Hence the water and the organic polyol may form a solution or an emulsion in the mixing stage and in the final elastomer gel product.

The nature of the resulting gel can be altered from a closed-cell gel at one extreme to an open-cell gel at the other extreme. The nature of the cells can be adjusted by controlling the water/organic polyol ratio which is added to the polyisocyanate prepolymer, by adjusting the nature of the polyisocyanate prepolymer, by varying the time sequence of one or more additions of the water and the organic polyol and by the type and amount of mixing.

The resulting liquid filled polyurethane elastomer gel can be cast in a shaped container, such as a mold cavity, and will assume the shape of the container as a thermoset product. Alternatively, the product can be formed into a glob of random shape for selected end uses. The product can be extruded as ribbons or cast as sheets if desired. In one application, the aqueous material filling the polyurethane gel is a scented substance containing a dissolved volatile perfume or fragrance or other solute which is gradually volatilized from the gel to function as an air conditioner, such as an air freshener. Other air treating solutes may be insecticides or bacteriacides.

In another application, the gel may be cast into a preshaped cavity to function as a prosthetic device for cosmetic purposes, e.g., artificial breasts to replace breasts which have been surgically removed by mastectomy procedures. In a further application, where the aqueous solution is electrically conductive, the material may be employed as a conductive pad for medical applications, such as electrocardiograph measurements.

In a still further application, the liquid filled polyurethane gel may function as a fire retardant filler pad for building construction and the like. In a still further application, the material may be formed in a spherical mold cavity to produce a ball for use as a toy. In a further application the material may be filled with aqueous solutions containing colorants such as colored dyes or pigments to function as marking devices, particularly where the material is employed in its globular, random shape. In a still further application, the material can be surface-tacky, whereby it will adhere to surfaces against which it is applied.

The foaming tendency of the reaction between water and isocyanate radicals of the prepolymer can be overcome by the use of the described polyether polyols in the prepolymers; by maintaining the water-to-prepolymer ratio above 4-to-1; by adding small amounts of anti-foaming additives such as silicone anti-foam agents.

DESCRIPTION OF THE DRAWINGS

There are no drawings.

DESCRIPTION OF THE PREFERRED EMBODIMENTS

The present aqueous liquid filled polyurethane gels are prepared by combining water and organic polyol under reactive conditions with a polyisocyanate prepolymer which is formed by combining an organic di-isocyanate with a polyol which is a diol or a triol having at least 40% of its weight in the form of ethylene oxide adducts and having a molecular weight the range of 3,000–10,000. The resulting polyisocyanate prepolymer has an NCO—value of 2.5–3.0.

The polyisocyanate prepolymer is intimately mixed with water and organic polyol in sufficient quantities for the water to function as a cross-linking agent between prepolymers as the gelation proceeds and the NCO—radicals are reacted. As the mixture thickens, the dispersed droplets of water and organic polyols are confined within the continuous phase of the polyurethane elastomer. The aqueous solution may also contain inorganic or organic solutes.

The aqueous reactant includes 25 to 65 weight percent water and 75 to 35 weight percent organic polyol. The organic polyol may be ethylene glycol, propylene glycol, diethylene glycol, dipropylene glycol or bis(2-hydroxy-ethoxyethyl) glutarate. Another desirable organic polyol is the digestion product of polyethylene terephthalate with organic diols such as ethylene glycol or bis(2-hydroxy-ethoxyethyl) glutarate.

In an alternative embodiment, a first portion of the aqueous reactant is mixed with the polyisocyanate prepolymer until gelation commences. Before gelation is completed, a supplemental quantity of water or organic polyol and possibly water is mixed into the gelling mixture. The unreacted aqueous reactant is confined in the product as a discontinuous phase of discrete liquid droplets. In general, the confined liquid comprises from about 75 to 95 percent of the weight of the resulting elastomer gel, i.e., the aqueous reactant is from 3 to 20 times the weight of the polyisocyanate prepolymer.

The aqueous reactant can be mixed in several ways with the polyisocyanate prepolymer. In one form all of the water and organic polyol can be prepared as a mixture and that mixture can be mixed with the polyisocyanate prepolymer. Alternatively some or all of the water can be initially mixed with the polyisocyanate prepolymer to initiate gelation. Before gelation is completed, the remainder of the water (if any) and the organic polyol may be mixed into the reacting mixture.

As a further alternative, some or all of the organic polyol may be mixed with the polyisocyanate prepolymer and thereafter all of the water and the remaining organic polyol may be mixed into the dispersed mixture. With this embodiment, the product elastomeric gel is normally transparent, particularly when cast in flat sheets. As a further alternative, a mixture of part of the organic polyol and part of the water can be initially mixed with the polyisocyanate prepolymer and thereafter a mixture of the remaining water and remaining organic polyol may be mixed with the polyisocyanate prepolymer.

EXAMPLES

Three polyisocyanate prepolymer formulations have been employed.

EXAMPLE 1

A mixture of the 2,4- and 2,6- isomers of toluene di-isocyanate is reacted with a diol containing 69% by weight ethylene oxide adducts and, 31% by weight propylene oxide adducts. The diol (molecular weight 3400) is sold by Dow Chemical Company as XD-1421. The resulting prepolymer (PREPOLYMER I herein) has an NCO—value of 2.8.

EXAMPLE 2

A mixture of the 2,4- and 2,6- isomers of toluene di-isocyanate is reacted with a glycerine based triol (molecular weight 4950) which was adducted with ethylene oxide and propylene oxide. The ethylene oxide is approximately 75 weight percent of the adduct. The resulting prepolymer (PREPOLYMER II herein) has an NCO—value of 2.8.

EXAMPLE 3

A still further prepolymer is prepared from isophorone di-isocyanate and the glycerine based triol described in Example 2. The resulting prepolymer (PREPOLYMER III herein) has an NCO—value of 2.8.

EXAMPLE 4

1 part by weight of PREPOLYMER II was combined with 9 parts by weight of water in a plastic beaker and the mixture was rapidly mixed by stirring with a spatula for 30 seconds. The gel time of the mixture was about 1 minute. The resulting gel was a stable gel and was readily removed from the beaker after setting as a disk-like plug. The plug remained exposed at room temperature for 24 hours and lost 30% of its weight, indicating evaporation of the contained water. The dimensions of the plug shrunk correspondingly.

The plug continued to lose weight over the next few days at a lower rate. The plug, when placed in water, absorbed water, expanded in size and approached its original weight.

EXAMPLE 5

1 part by weight of PREPOLYMER II was combined with 4.5 parts by weight water and mixed for 20 seconds with a spatula in a plastic beaker. Then 4.5 grams of propylene glycol was added to the mixture and stirred rapidly. The second mixing required about 15 seconds. The mixture was allowed to settle. A hardened disk-like plug was removed. The plug remained exposed at room temperature for 24 hours and lost 17% of its weight.

EXAMPLE 6

1.6 parts by weight of the PREPOLYMER II was mixed with 3.4 parts by weight water for 20 seconds. Thereafter 5.0 parts by weight of propylene glycol was added and the mixture was stirred in a plastic beaker. The mixture was allowed to settle and was removed from the cup as a disk-like plug. After 24 hours exposure at room temperature, the plug lost 12% of its weight.

EXAMPLE 7

An aqueous mixture was prepared including 20 parts by weight water and 14 parts by weight polyethylene glycol having a molecular weight of 600. The aqueous mixture was combined with 16 parts by weight of PREPOLYMER II and mixed for 20 seconds by stirring in a plastic beaker. Thereafter, 50 parts by weight of propylene glycol was stirred into the mixture. The resulting disk-like plug was exposed at room temperature for 24 hours and lost 8% of its weight. After 5 days at room temperature exposure, the overall weight loss was 16%.

EXAMPLE 8

1 part by weight of PREPOLYMER I was combined with 9 parts by weight of a 1.0 normal aqueous solution of potassium chloride and the mixture was stirred for 20 seconds in a plastic beaker. Before gelation was completed, the mixture was poured into a flat surface as a cast sheet. The resulting article was electrically conductive.

EXAMPLE 9

15 parts by weight of PREPOLYMER I was combined with 50 parts by weight water and mixed by rapid stirring for 20 seconds in a plastic beaker. Thereafter 40 parts by weight propylene glycol was added and the mixture was stirred for 15 seconds. Thereafter 10 parts by weight of an aqueous perfume solution (containing lime and lemon fragrances) was stirred into the mixture. The resulting plug, when placed in a room, released the perfume fragrance into the air over a period of many weeks.

EXAMPLE 10

2.5 parts by weight of PREPOLYMER III was combined with 2.5 parts by weight water and stirred rapidly with a spatula in a plastic beaker for 45 seconds. Then 5.0 parts by weight propylene glycol was added to the mixture and stirred rapidly for 15 seconds. The mixture settled and gelled to form a clear disk-like plug. The plug was exposed at room temperature for 24 hours and lost 8 percent of its weight.

EXAMPLE 11

Example 5 was repeated except that the mixture was introduced into a billiard ball mold and allowed to complete the cure therein. The mold was a two-piece plastic mold having a spherical cavity of about 2½-inches diameter. When the article was removed from the mold, the pouring sprue was cut and the resulting ball had interesting characteristics as a toy. The ball is soft and readily deformable. The ball surface feels cool and somewhat tacky. The ball will bounce readily if confined in a plastic bag. However when exposed to the air, the ball tends to adhere loosely to most surfaces. For example, the ball may be tossed against a horizontal surface, such as a table top, and the ball will remain where it first engages the surface. The ball may be tossed against a vertical or sloping wall and the ball will adhere where it first strikes the surface, but then will slowly roll down the vertical or sloping surface. If the ball develops a coating of dirt, lint or debris as a result of plug, the surface can be restored by gentle washing in water.

EXAMPLE 12

32 grams of the PREPOLYMER II were mixed with 68 grams water for 17 seconds. Thereafter 100 grams ethylene glycol were added to the mix and the resulting mixture was stirred for 15 seconds. The resulting elastomer gel was a soft, sticky casting. This soft, sticky composition is useful for some applications. The product may be cast in sheets which can be employed to cover open wounds. The compositions also may contain dissolved antiseptics or antibiotics.

EXAMPLE 13

32 grams of PREPOLYMER II were mixed with 68 grams water for 12 seconds. Thereafter 100 grams diethylene glycol were added and the resulting mixture was stirred 15 seconds. A good casting was obtained having a slightly sticky surface.

EXAMPLE 14

32 grams of PREPOLYMER II were mixed with 68 grams water for 17 seconds. Thereafter 100 grams dipropylene glycol were added and the resulting mixture was stirred for 15 seconds. The resulting casting was quite firm, dry and relatively tack-free.

EXAMPLE 15

32 grams of PREPOLYMER II were mixed with 168 grams water and the resulting mixture stirred for 30 seconds. The product was cast into as rectangular block 2 inches by 4 inches by 4 inches.

EXAMPLE 16

32 grams of PREPOLYMER II were mixed with 68 grams of water for 17 seconds and thereafter 100 grams of propylene glycol were added and the mixture stirred for 15 seconds. The resulting material was cast in a rectangular block 2 inches by 4 inches by 4 inches. The block was very soft.

EXAMPLE 17

32 grams of PREPOLYMER II were mixed with 68 grams of water and stirred for 17 seconds. Thereafter 100 grams of a polypropylene oxide triol were added to the mixture and the resulting mixture was stirred for 15 seconds. The triol is available under the trade name Plurocol TP-2540. The material has a molecular weight of 2540 and a hydroxyl value of 66.

This mixture was cast in a rectangular block 2 inches by 4 inches by 4 inches.

EXAMPLE 18

32 grams of PREPOLYMER II were mixed with 68 grams water and stirred for 17 seconds. Thereafter 100 grams of a digested polyethylene terephthalate were added and the resulting mixture stirred for 15 seconds. The digested polyethylene terephthalate resin was obtained by heating polyethylene terephthalate chips in the presence of diethylene glycol glutarate at elevated temperatures to depolymerize the polyethylene terephthalate and produce a lower molecular weight polyol having a hydroxyl value of 220 and a viscosity of 4,000 cps. The resulting mixture was cast in a rectangular mold 2 inches by 4 inches by 4 inches.

EXAMPLE 19

32 grams of PREPOLYMER II were mixed with 68 grams water for 17 seconds. Thereafter 100 grams of bis(2-hydroxy-ethoxyethyl) glutarate were added and the resulting mixture was stirred for 15 seconds. The resulting material was cast in a rectangular block 2 inches by 4 inches by 4 inches.

HEAT AGING TESTS

| | | "00" Durometer Readings | | | |
|---|---|---|---|---|---|
| Example | Polyol | Initial | 3 days | 5 days | 7 days |
| 15 | None (all water) | — | Shrunken plug | — | — |
| 16 | Propylene glycol | 6 | (Liquid) | — | — |
| 17 | Polypropylene oxide | 32 | 23 | 23 | 21 |
| 18 | Digested PETA (a) | 27 | 11 | 5 | 1.5 |
| 19 | Glutarate (b) | 9 | (Liquid) | — | — |

(a) Polyethylene terephthalate digested with bis(2-hydroxy-ethoxyethyl) glutarate.
(b) bis(2-hydroxy-ethoxyethyl) glutarate.

An accelerated heat aging test was developed to compare the stabilization of the liquid filled polyurethane elastomer gels. Each gel was formed in the shape of a rectangular block 4 inches by 4 inches by 2 inches (Examples 15, 16, 17, 18). Each rectangular block was sealed in a moisture impervious transparent plastic bag and the bags were placed in an oven at 160 degrees Fahrenheit. The deterioration of each sample was periodically observed.

Example 15 which contained water only as the additive deteriorated rapidly. At the elevated temperature, essentially all of the water separated from the gel and the gel shrunk to a small plug.

Example 16 which contained polypropylene glycol as the organic polyol formed a dark liquid. The propylene glycol apparently acted as a solvent which depolymerized the elastomer gel. Example 19 which employed bis(2-hydroxy-ethoxyethyl)glycol also turned to a dark liquid within three days.

Example 17 which employed polypropylene oxide as the organic polyol exhibited the best high temperature stability. Example 18 employing the solvent digested polyethylene terephthalate also exhibited acceptable heat aging characteristics.

APPLICATIONS

Fire Insulation—The gelled products of 75 to 90% by weight liquid can be used as a filler in light weight door constructions between external veneer layers. In this application, the liquid filled gel supplies weight to the door and also provides resistance to the passage of fire. The gel slab should be encapsulated to retard evaporation of the retained aqueous droplets. Evaporation of the aqueous fillers can be retarded by employing glycols in the aqueous liquids as in Examples 5, 6. By employing higher molecular weight glycols as in Example 7, the evaporation is still further retarded.

It is possible to employ additional prepolymer and to create closed cell gels in which the evaporation of much of the aqueous liquid is retarded. Where water retention is desired, as in the fire insulation material, the closed cell gels are preferred. Where volatilization is desired as in the case of air freshening devices above described, the open-cell gel is preferred.

The electrically conductive gels as described in Example 8 employ aqueous solutions of electrolytes. These conductive gels are useful when cast into films or when extruded as strips. In this form, the electrically conductive gels can be employed as surface contacts for medical testing, e.g., pads for electrocardiograph probes.

As shown in Example 9, an air freshener can be produced by combining a water dispersable fragrance in the gel. The aqueous phase may contain insect repellants or insecticides or bacteriacides or other volatile air treating chemicals if desired.

PROCESSING

Small batches of the present elastomer gel can be prepared as described by manually mixing the aqueous ingredient with the polyisocyanate prepolymer phase. Larger batches can be prepared with powered mixers. Even production batches can be handled with large mixers. For production batches, impingement mixers are preferred.

The product can be shaped by casting in sheets, by extrusion, by casting in inexpensive molds, such as plastic or silicone rubber molds. There is no requirement that the molds be heated.

By employing smaller quantities of the prepolymer and large quantities of less volatile liquids such as glycols, the resulting gel can be formed into a sticky glob having random shape. The glob can be tossed about and has a utility as a toy. When, for example, the glob thrown on to a flat, horizontal surface, it quickly adheres without bouncing. If the glob has a tacky surface in the aqueous dispersed phase, the glob can be stuck on a vertical, or sloping surface when thrown against such vertical or sloping surface. In this application, the glob can be brightly colored and can function as a readily indentifiable marking device. The aqueous phase may contain a colorant or the polyurethane elastomer may contain a colorant or both phases may be selectively colored.

The glob of random shape can be filled with explosive substances and has military applications as an explosive which can be projected and adhered to a desired target.

The aqueous dispersed phase need not be a solution but can be an emulsion or dispersion of nonsoluble or slightly soluble ingredients. In this embodiment, oil based pigments or dyes can be dispersed throughout the aqueous phase to provide suitable colors for the resulting product.

The resulting gel can be chilled so that the dispersed liquid phase is frozen solid. The gels successfully pass repeated freeze-thaw cycling tests without deterioration. The solid product has interesting puncture-proof and leak-proof characteristics. When a specimen of the product is sliced with a sharp blade, there is no identifiable leakage of moisture over the cut surface. The product has remarkable shock resisting properties and functions as in inexpensive shock absorber.

Samples of the present liquid-filled gel will re-absorb up to about 66% of the weight loss if they are replaced in water or aqueous solutions. Thus, the present liquid-filled gels can be reused as controlled volatile liquid release devices.

In one particularly useful application, a liquid-filled gel as described in Example 7 has been employed to mold prosthetic devices in the form of artificial breasts for mastectomy patients. The material has the texture and feel of human flesh and has a density which simulates that of human flesh.

We claim:

1. A method for producing a thermoset article having a polyurethane elastomer continuous phase and having dispersed liquid-phase droplets as a discontinuous phase, comprising:

A. obtaining polyisocyanate prepolymer having an NCO—value of 2.5–3.0, formed from the reaction of organic di-isocyanate and organic polyether polyol, containing at least 40 percent by weight ethylene oxide adducts;

B. mixing said polyisocyanate prepolymer under reactive conditions with an aqueous reactant including 25 to 65 percent by weight water and 75 to 35 percent by weight of organic polyol, the weight of said aqueous reactant being from 3 to 20 times the weight of said polyisocyanate prepolymer;

C. after gelation of the mixture has commenced but before gelation has completed, forming the mixture into a desired shape until the mixture cures with discrete droplets of unreacted aqueous reactant homogeneously dispersed therethrough; and D. recovering a homogeneous shaped article containing from 75 to 95 percent by weight of the said aqueous reactant.

2. The method according to claim 1 wherein the said organic polyol is a glycol, selected from the class consisting of ethylene glycol, propylene glycol, dipropylene glycol, bis(2-hydroxy-ethoxyethyl) glutarate and polypropylene oxide adducts of diols or triols.

3. The method according to claim 1 wherein the said organic polyol is a digestion product formed by digesting polyethylene terephthalate with a diol, such digestion product having a hydroxyl value of 180 to 250 and a molecular weight less than 15,000.

4. The method according to claim 3 wherein the said diol is bis(2-hydroxy-ethoxyethyl) glutarate.

5. The method of claim 1 wherein the said mixture is formed into a desired shape by being introduced into a mold cavity having the said desired shape and is retained within the mold cavity until cured.

6. The method of claim 5 wherein the said mold cavity has a spherical shape.

7. The method of claim 1 wherein the said organic di-isocyanate is selected from the class consisting of toluene di-isocyanate and isomeric mixtures thereof and isophorone di-isocyanate; and the said organic polyether polyol has a molecular weight of 3,000–10,000.

8. The method of claim 7 wherein the said organic polyether polyol contains at least 45 weight percent ethylene oxide adducts.

9. The method of claim 1 wherein the said aqueous reactant contains dissolved volatile perfumes, fragrances or other solutes which can be detected by scent.

10. The method of claim 1 wherein the said aqueous reactant contains dissolved volatile insecticides or bacteriacides.

11. The method of claim 1 wherein the said aqueous reactant contains dissolved electrolytes and the resulting article is electrically conductive.

12. The method of claim 1 wherein the said polyurethane elastomer contains a colorant.

13. The method of claim 1 wherein the said aqueous reactant contains a colorant.

14. An article having a desired shape and comprising a polyurethane elastomer as the continuous phase and comprising as the discontinuous phase, homogeneously dispersed discrete droplets of an aqueous liquid including 25 to 65 percent by weight water and 75 to 35 percent by weight of organic polyol, said discontinuous phase comprising from 75 to 95 percent of the weight of the said article.

15. The article of claim 14 having as the said organic polyol is selected from the class consisting of ethylene glycol, propylene glycol, diethylene glycol, dipropylene glycol, bis(2-hydroxy-ethoxyethyl) glutarate and polypropylene oxide adducts of diols or triols.

16. The article of claim 15 in a spherical shape.

17. The article of claim 16 wherein the said glycol is a digestion product formed by digesting polyethylene terephthalate with a diol, such digestion product having a hydroxyl value of 180 to 250 and a molecular weight less than 15,000.

18. The article of claim 14 shaped into a prosthetic device for the human body.

*19. A method of producing an article having a desired shape and comprising a polyurethane elastomer continuous phase and homogeneously dispersed discrete droplets as a discontinuous phase, comprising the steps of:*

*mixing a polyisocyanate prepolymer and an aqueous liquid including 25 to 65 percent by weight water and 75 to 35 percent by weight organic polyol to homogeneously disperse discrete droplets of said aqueous liquid as said discontinuous liquid phase,*

*forming the article into the desired shape,*

*recovering said shaped article having a discontinuous phase comprising 75 to 95 percent of the weight of said article.*

*20. The method set forth in claim 19 wherein said organic polyol is selected from the class consisting of ethylene glycol, propylene glycol, diethylene glycol, dipropylene glycol, bis (2-hydroxy-ethoxyethyl) glutarate and polypropylene oxide adducts of diols or triols.*

*21. The method set forth in claim 20 wherein said article is formed into a spherical shape.*

*22. The method set forth in claim 20 wherein said glycol is a digestion product formed by digesting polyethylene terephthalate with diol, said digestion product having a hydroxyl value of 180 to 250 and a molecular weight less than 15,000.*

*23. The method set forth in claim 19 wherein said article is formed into a prosthetic device for the human body.*

*24. The method set forth in claim 19 wherein said polyisocyanate prepolymer is formed from the reaction of organic di-isocyanate and organic polyether polyol.*

*25. The method set forth in claim 24 and including after gelation of the mixture has commenced but before gelation has completed, forming said article into the desired shape until the mixture cures with discrete droplets of unreacted aqueous liquid homogeneously dispersed therethrough.*

*26. The method set forth in claim 25 wherein the said organic polyol is a glycol, selected from the class consisting*

*of ethylene glycol, propylene glycol, dipropylene glycol, bis(2-hydroxy-ethoxyethyl) glutarate and polypropylene oxide adducts of diols or triols.*

*27. The method set forth in claim 25 wherein the said organic polyol is a digestion product formed by digesting polyethylene terephthalate with a diol, such digestion product having a hydroxyl value of 180 to 250 and a molecular weight less than 15,000.*

*28. The method set forth in claim 26 wherein the said diol is bis(2-hydroxy-ethoxyethyl) glutarate.*

*29. The method set forth in claim 25 wherein the said mixture is formed into a desired shape by being introduced into a mold cavity having the said desired shape and is retained within the mold cavity until cured.*

*30. The method set forth in claim 29 wherein the said mold cavity has a spherical shape.*

*31. The method set forth in claim 25 wherein the said organic di-isocyanate is selected from the class consisting of toluene di-isocyanate and isomeric mixtures thereof and isophorone di-isocyanate; and said organic polyether polyol has a molecular weight of 3,000–10,000.*

*32. The method set forth in claim 31 wherein the said organic polyether polyol contains at least 45 weight percent ethylene oxide adducts.*

*33. The method set forth in claim 25 wherein the said aqueous reactant contains dissolved volatile perfumes, fragrances or other solutes which can be detected by scent.*

*34. The method set forth in claim 25 wherein the said aqueous reactant contains dissolved volatile insecticides or bacteriacides.*

*35. The method set forth in claim 25 wherein the said aqueous reactant contains dissolved electrolytes and the resulting article is electrically conductive.*

*36. The method set forth in claim 25 wherein the said polyurethane elastomer contains a colorant.*

*37. The method set forth in claim 25 wherein the said aqueous reactant contains a colorant.*

*38. The method set forth in claim 19 and including the steps of obtaining polyisocyanate prepolymer formed from the reaction of organic di-isocyanate and organic polyether polyol, containing at least 40 percent by weight ethylene oxide adducts and mixing said polyisocyanate prepolymer under reactive conditions.*

* * * * *